June 24, 1924.　　　　　　　　　　　　　　　　　　1,498,911
H. S. HATFIELD
MEANS AND PROCESS OF SEPARATING SUBSTANCES ONE FROM ANOTHER
Filed Feb. 4, 1921　　　3 Sheets-Sheet 1
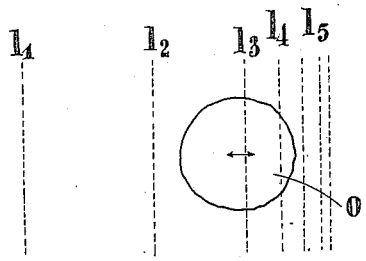
Fig.1.
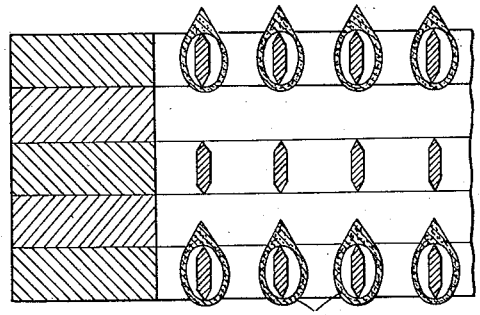
Fig.14.
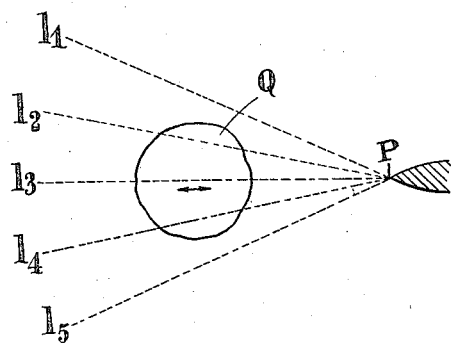
Fig.2.
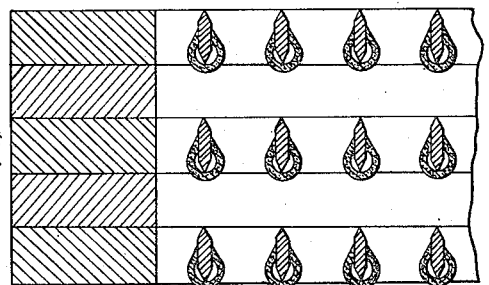
Fig.15
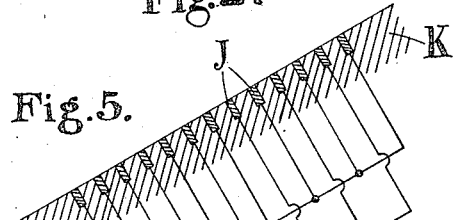
Fig.5.
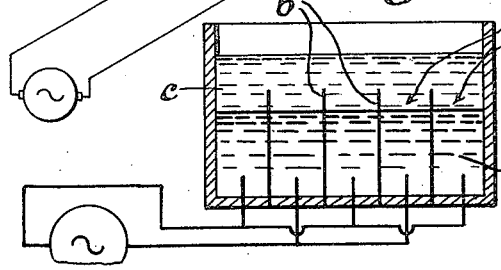
Fig.11ª
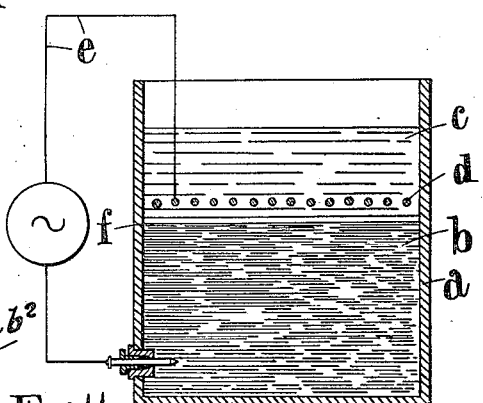
Fig.11.
INVENTOR
H. S. Hatfield,
BY Marks & Clerk
ATTORNEYS

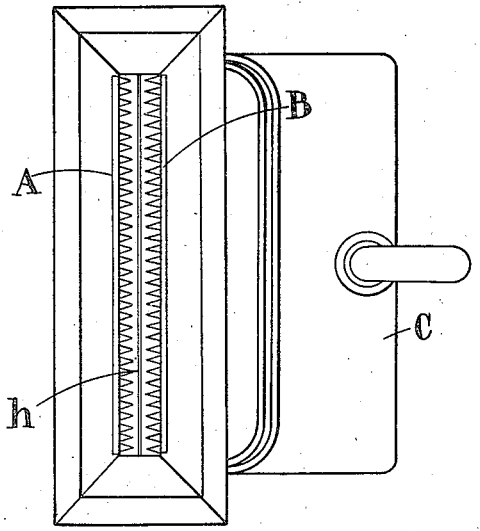
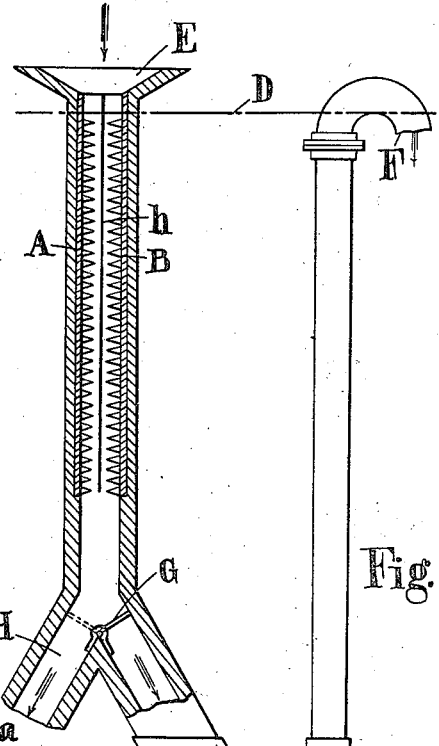
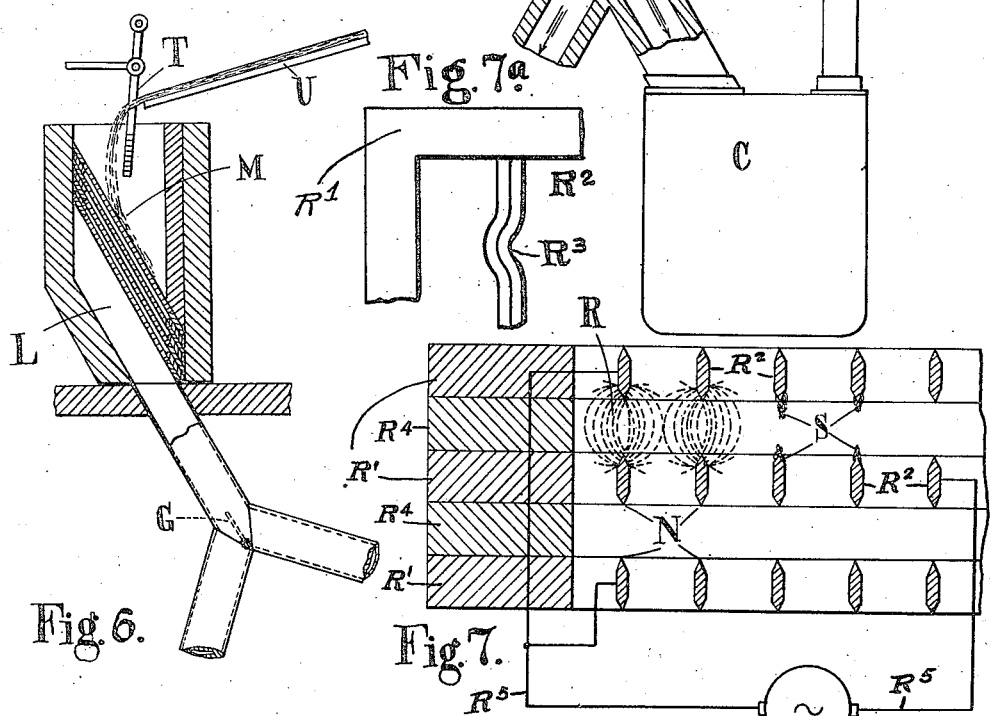

June 24, 1924.

H. S. HATFIELD 1,498,911

MEANS AND PROCESS OF SEPARATING SUBSTANCES ONE FROM ANOTHER

Filed Feb. 4, 1921   3 Sheets-Sheet 3

INVENTOR
H. S. Hatfield
BY
ATTORNEYS

Patented June 24, 1924.

1,498,911

UNITED STATES PATENT OFFICE.

HENRY STAFFORD HATFIELD, OF LONDON, ENGLAND, ASSIGNOR TO IMPERIAL TRUST FOR THE ENCOURAGEMENT OF SCIENTIFIC AND INDUSTRIAL RESEARCH, OF LONDON, ENGLAND.

MEANS AND PROCESS OF SEPARATING SUBSTANCES ONE FROM ANOTHER.

Application filed February 4, 1921. Serial No. 442,521.

*To all whom it may concern:*

Be it known that I, HENRY STAFFORD HATFIELD, a subject of the King of Great Britain and Ireland, and residing at 34 Stanley Gardens, London, N. W. 3, England, have invented certain new and useful Improvements in and Relating to Means and Process of Separating Substances One from Another, for which the following is a specification.

This invention relates to new and improved means for separating the constituents of mixtures of finely divided substances one from another.

In this specification the word "powder" will be used to include liquids as well as solids. It is desired that it be understood that I do not limit this invention to the devices hereinafter described, nor are the words "powder" or "suspension" to be understood in a restricted sense, but as denoting generally particles of any size distributed through a liquid medium.

According to this invention the powder the constituents of which are to be separated one from another is suspended in a liquid the dielectric capacity of which lies between that of the constituents of the said powder. Electrodes in the liquid are connected to an electric supply of considerable potential, preferably but not necessarily alternating; an electrostatic field between the electrodes is thereby produced. Those suspended particles of greater dielectric constant than the liquid will then be found to move so as to place themselves along the shortest lines between the electrodes; that is, in the strongest part of the electrostatic field. On the other hand, those particles of less dielectric capacity than the liquid will move out of the electrostatic field between the electrodes. The rule is that the particles tend to move so as to increase the dielectric capacity of the system.

The term "dielectric capacity" as used throughout this specification refers to the constant as deduced from the actual behaviour of the substance under the conditions of this method of separation. It is well known that the "dielectric capacity" is subject to great variation from various causes; for instance, it varies with the frequency of the electric field used. Particularly under the conditions of this method of separation, the electrical conductivity of the particles produces the effect of an apparent rise in the dielectric capacity. Thus particles of a certain natural sand were found to be attracted to the electrodes in acetylene tetrachloride. On heating this sand for a short time to a temperature below a red heat, it was found that they were no longer attracted. This effect was probably due to the removal of a slightly conducting film from the surface of the particles, which simulated a rise in the dielectric capacity.

If one of the conducting boundaries of the electric field be formed by a conducting liquid, which is immiscible with the liquid forming the medium of suspension, then the particles of suspension of less dielectric constant than the medium in which they are suspended will tend to be driven into the liquid electrode; for as they pass into it their places in the field are filled by the suspension medium closing in, and since this has a higher dielectric constant than the particles, the total capacity of the field is increased.

Above I referred to the separation of non-conducting particles only. If the insulating bodies referred to be replaced by conducting bodies, they will behave as if their dielectric constant were infinite, that is to say, they will always move into the strongest part of the field. If bare metal electrodes are used, the presence of conducting particles in the suspension gives rise to short circuits if they are permitted to accumulate on the electrodes, since they tend to form chains which finally reach from electrode to electrode and short circuit. It is, however, quite easy to avoid this effect and so apply the method to suspensions containing conducting particles, by interposing porous separators between the electrodes, or otherwise suitably insulating them.

The invention consists in a method of separating the constituents of a mixture of finely divided substances one from another, in which the said mixture is suspended in a suitable liquid which is caused to flow through an electrostatic field produced by electrodes connected to an electric current supply of high potential.

The invention consists in a method for separating the constituents of a mixture of finely divided substances one from another by suspending the said mixture in a liquid the dielectric capacity of which lies between that of the constituents of the mixture which are to be separated one from another and producing an electrostatic field in the said liquid between electrodes connected to an electric supply.

The invention includes the use of aniline as a suspension medium for effecting the separation of cassiterite from the ore in the manner set forth.

The invention also includes the use as a suspension medium of a mixture of nitrobenzene and paraffin oil in suitable proportions to give the required dielectric constant when effecting separation in the manner set forth.

The invention also includes the addition of a deflocculating agent, such as neat's foot oil, to the suspension medium when effecting separation in the manner set forth.

The invention includes an apparatus for the purpose set forth comprising a surface of non-conducting material covered with a plurality of parallel conductors alternately oppositely charged over which flows the medium in which the mixture is suspended.

The invention also includes an apparatus for the purpose set forth comprising a vessel divided by two or more metal gratings, which are alternately oppositely charged and through which flows the medium in which the mixture is suspended.

In a modification of the apparatus, one of the conducting boundaries of the electric field is formed by a conducting liquid which is immiscible with the liquid forming the medium of suspension.

In a further modification, both electrodes are formed of water or other conducting fluid.

The invention also includes means for preventing short circuiting of the electrodes.

Short circuiting of the electrodes may be prevented by wholly or partially insulating all or part of the bars of every sieve or of alternate sieves.

The invention also includes insulators of such form that matter from the suspension cannot settle upon their upper surfaces.

The invention consists in the methods and apparatuses for the purpose set forth as hereinafter described with reference to the accompanying drawings.

In order that the carrying of the invention into effect may be understood, reference will now be made to the accompanying drawings, in which:—

Figures 1 and 2 diagrammatically represent lines of electric force, and illustrate the theory upon which the invention is based;

Figure 3 is a side view partly in section of one form of the apparatus.

Figure 4 is a top plan view of the same.

Fig. 5 is a diagrammatic view of another form of the invention.

Figure 6 is a vertical sectional view of an apparatus having inclined sieves or grates.

Figure 7 is a sectional view of a portion of an apparatus employing horizontally arranged grates.

Figure 7$^a$ is a top plan view of a portion of one of the grates shown in Figure 7.

Figure 8:
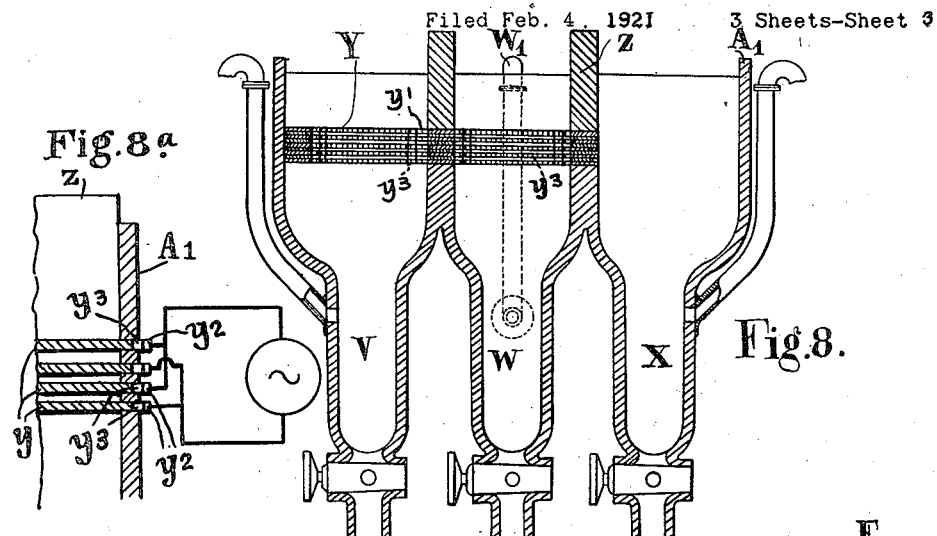

Figure 8 is a vertical sectional view of an apparatus having a sliding grate.

Figure 8$^a$ is a detail sectional view showing the mechanism for energizing the grates shown in Figure 3.

Figure 9:
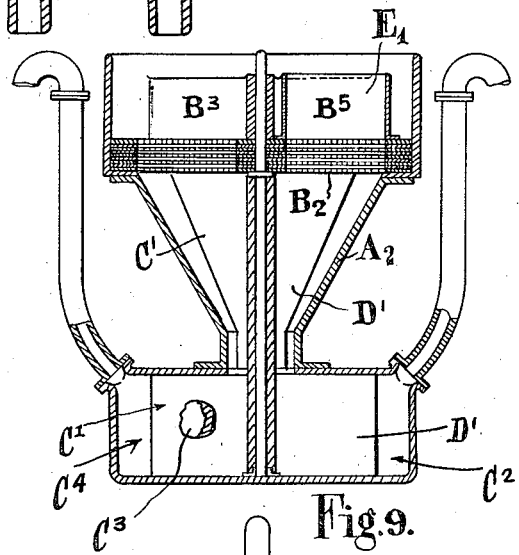

Figure 9 is a similar view of a modification having a rotatable grate.

Figure 10:
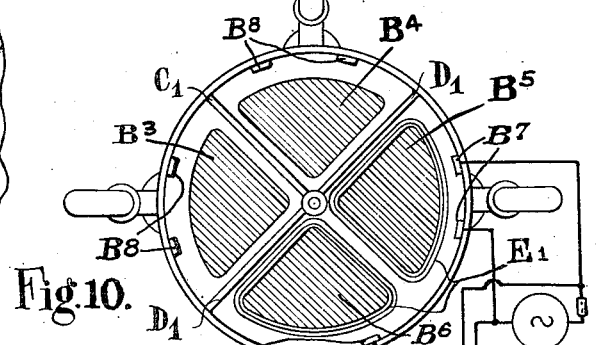

Figure 10 is a top plan view of the form shown in Figure 9.

Figure 11 is a vertical sectional view of a construction employing a liquid electrode.

Figure 11$^a$ is a similar view of a modification employing liquid electrodes.

Figures 12, 13, 14 and 15 are modifications of the construction shown in Figure 7 and illustrating means for insulating the bars of one grate from the bars of adjacent grates.

In Figures 1 and 2 of the accompanying drawings, the dotted lines $l_1$, $l_2$, $l_3$, $l_4$, $l_5$ represent lines of electric force. In Figure 1 they are shown parallel to one another, the distance between them progressively decreasing towards the right hand. The strength of an electric field is represented by the spacing of the lines of force, and so the field in Figure 1 is represented as becoming progressively stronger from left to right. In Figure 2 the lines are represented as radiating out from a point P, which may in reality be a point or may be the section of a knife edge. If bodies are placed in these fields as represented by the outlines O and Q, they will move towards the stronger part of the fields if their dielectric coefficients are greater than that of the surrounding medium, and towards the weaker part if their dielectric coefficients are less than that of the medium. The body in Figure 1 will therefore be urged in a direction at right angles to the lines of force, whereas the body in Figure 2 will be urged in a direction along the lines of force. It will be attracted to the point P and will adhere to it if its dielectric coefficient be greater than that of the medium.

In carrying the invention into effect in one form as shown in Figures 3 and 4 of the accompanying drawings, two plates A and B set parallel to one another are covered with fine metallic points upon the surfaces adjacent to one another. They form the sides of one limb of a vessel C, which is filled with the suspension to be treated up to the level D, the suspension flowing in at E and out at F. The two plates A and B are suitably insulated (for instance, the rest of the vessel may be made of glass, wood, or other insulator) and connected to an electric supply. At G is a two-way valve by means of which the contents of the vessel A B may be periodically discharged through a side tube H. Those particles in the suspension which have a higher dielectric coefficient than the liquid will be attracted to the points and will adhere to them. When sufficient has accumulated, a wash of pure liquid is sent down; the valve G is then turned, and at the same instant the electric current is cut off from the plates A and B, and if found necessary they are tapped to cause the particles deposited upon them to fall off. The substance collected is thus discharged with the liquid at H.

In carrying out this invention in another form, as illustrated by Figure 5 of the accompanying drawings, a surface of non-conducting material K is covered with fine closely arranged parallel conductors J, J, J, embedded in the surface with their upper edges exposed, and alternately oppositely charged. A suspension of powder in a suitable medium is caused to flow over the said surface. The constituent which is attracted into the electrostatic field is then held back on the surface, and when sufficient has accumulated there the flow of suspension is stopped, and the electric supply disconnected. The accumulated attracted matter is then washed off or otherwise suitably removed. The aforesaid surface behaves in a manner analogous to the surfaces of rag-frames and other surfaces used in water concentration of mineral ores, in which process suspensions of finely powdered ore in water flow over inclined surfaces, the greater specific gravity of one constituent being relied upon to cause it to remain behind upon the surface. In this invention, when using an electric surface as above described, the constituent of higher dielectric capacity tends to remain behind upon the surface. It will usually be found desirable to disconnect the electric current from that part of the surface from which the attracted matter is to be removed.

In carrying out this invention in another form, as illustrated by Figure 6 of the accompanying drawings, a vessel L is divided horizontally or obliquely by means of two or more fine metal gratings M placed one above the other, very close together, and connected to the opposite poles of an electric supply, thus forming what I term an electric sieve.

The construction of these gratings may be of various types. Woven wire gauze has the disadvantage that the suspension tends to settle mechanically at the points of crossing of the wires. A better plan is to form the gratings of metallic strip set on edge. In Figure 7 the magnified section of a part of a set of such gratings is shown. The upper and lower edges N of the strips may often be made very sharp with advantage, whereby the strength of the electric field at their edges is increased, and consequently the holding power for attracted particles. The dotted lines R in the diagram represent lines of electric force; at other points S of the diagram the manner in which solid particles attach themselves is shown. It will be seen that this construction possesses certain advantages over that of Figures 3 and 4, which may in certain cases compensate for its greater complication. The attracted particles are taken out of the line of flow of the suspension. In the construction of Figures 3 and 4 they remain exposed to the flow, and if not held firmly may gradually drift along with the stream from point to point until they escape altogether.

Such gratings may be constructed as follows: Sheet metal frames $R^1$ are made of the same thickness as the width of the strips $R^2$ to be mounted. The strips $R^2$ are cut to the correct length and placed in a jig. The frame $R^1$ is then fitted around them and the strips attached to the frame by soldering. In order that the finished and mounted strips shall all be in tension, the two sides of the frame which are parallel to the strips are cooled during the soldering so as to cause them to contract. If the strips are to be of considerable length, it is further advisable to crimp them into a wave form at one or more points of their length as shown at $R^3$ in Fig. 7$^a$, thereby ensuring that there is sufficient latitude for the expansion of the sides of the frame to enable all the strips to come under tension.

Similar frames $R^4$ are made of insulating material, the thickness being determined by the gap which it is desired to leave between the gratings. The electric sieve is then built up by laying the grating frames $R^1$ and insulating frames $R^4$ one upon the other, suitable electric connections $R^5$ being arranged for. It is important to avoid in the construction any ledges or the like upon which mechanical lodgment of the suspension can take place.

In Figure 6 the electric sieve M is shown in section set obliquely in the vessel L, which is rectangular in shape. A larger sieve may thus be employed in the same vessel than if it were set horizontally. T is a stirrer which, oscillating to and fro, distributes the pulp or suspension as it flows in from the launder U. At G is a two-way valve, as in Figure 3.

A number of other constructional forms of apparatus in which the electric sieve principle is used depend upon moving a sieve which has been charged in one part of a vessel to another part of the vessel to discharge it. One apparatus of the kind is represented diagrammatically in Figure 8. $A_1$ is a rectangular vessel, which terminates below in three sumps V, W and X. Y is an electric sieve with two openings. The strips of the two halves of the sieve are insulated from one another by insulation and can be connected to or disconnected from the electric current independently of one another by means hereinafter described. The openings in the sieve correspond to the sumps V, W and X. One opening of the sieve Y is always over the middle sump W, while the other is over one or other of the outer sumps. There is a rectangular box Z open at the bottom, which rests upon the sieve. Its inside dimensions correspond to one of the openings in the sieve, and the top of the sieve frame and the bottom of the box Z are in sliding contact so that solid matter is not able to penetrate between them. The suspension is fed into the box Z, the grating thereunder being electrically charged. It flows through the sieve and the desired constituent is retained, the remainder collecting in the sump W or overflowing with the liquid by means of the pipe $W_1$ (shown dotted in the drawing). When the sieve Y is loaded to its capacity with attracted matter, it is moved by any suitable means (not shown) so as to bring the part charged over one of the side sumps V or X. The box Z is retained in position, the sieve Y sliding under it. The flow of suspension is thus made to pass through the other division of the sieve Y, which is now connected to the electric supply. A suitable means for connecting and disconnecting the strips of the two halves of the sieve Y is shown in Figure 8$^a$, and it comprises fixed contacts $Y^2$ which cooperate with movable contacts $Y^3$ carried by the strip frames. There is a set of the contacts $Y^3$ for each half of the frame as shown in Figure 8. The charged half of the sieve Y at the proper time is disconnected, and the collected matter falls into the sump. The two outside sumps V and X thus collect that constituent which is retained by the sieve Y, while the middle compartment W receives the other constituent or constituents. In some cases it will be found desirable to make arrangements, which need no detailed description, to wash the sieve Y when charged with attracted matter before discharging it.

The reciprocating motion of the grating above described may be replaced by a continuous circular motion. Figures 9 and 10 show diagrammatically the elevation and plan of such a form of apparatus. The vessel $A_2$ is circular, and upon a ledge in it rests the sieve $B_2$, which is divided into four separate sectors $B^3$, $B^4$, $B^5$ and $B^6$ which can be electrified independently of one another by means of stationary contacts $B^7$ connected with a source of electrical energy, and movable contacts $B^8$ mounted on the sieve sections. The vessel $A_2$ is divided vertically into two or more parts, one convenient way being to divide the vessel vertically into two quadrants and a semicircle by the partitions $C_1$ and $D_1$ which are integral with the walls of the vessel $A_2$.

The suspension is fed into the boxes $E_1$, the gratings $B^5$ and $B^6$ thereunder being electrically charged. It flows through the sieve $B_2$ and the desired constituent is retained, the remainder collecting within the semi-circular sump $C^2$ or overflowing with the liquid by means of the pipe provided. When the sieve is loaded to its utmost capacity with attracted matter it is moved so as to bring the part charged over one of the quadrant-shaped sumps $C^3$ and $C^4$, the boxes $E^1$ being retained in position while the sieve revolves beneath them. The flow of suspension is thus made to flow through the other divisions $B^3$ and $B^4$ of the sieve $B_2$, which is now connected to the electric supply. The charged half of the sieve $B_2$ is disconnected and the collected matter falls into the quadrant-shaped sumps which thus collect the constituent which is retained by the sieve while the semicircular compartment receives the other constituent or constituents. The brushes $B^7$ and contacts $B^8$ are provided so that the sectors of the grating are cut off from the current as soon as they have passed into the other half of the vessel where they drop their load of suspended matter. As they pass again into the stream of suspension they are automatically connected again to the electric supply.

As an example of the separations to which this invention may be applied, the cassiterite in tin ore when suspended in aniline is strongly attracted, while the gangue is not affected. The conductors used may be 0.25 to 1 millimetre apart, and be charged with alternating current of 200 volts.

For the separation of cassiterite, and for separation generally, a mixture of nitrobenzene and paraffin oil, which may be adjusted to any desired dielectric constant between 2 and 36, is very useful. With fine suspensions it is necessary sometimes to add an agent which produces deflocculation of the suspension. I have found neat's foot oil useful for this purpose. About 1 per cent by volume is usually sufficient.

As a general rule, direct current is not desirable, as electro-osmose may then interfere with the phenomena above described.

As previously stated, the underlying physical principle of my method of separation is this:—that particles of substance in an electric field, when free to move, move in such a manner as to increase the electrostatic capacity of the field force. If one of the conducting boundaries of the electric field be formed by a conducting liquid, which is immiscible with the liquid forming the medium of suspension, then the particles of suspension of less dielectric constant than the medium in which they are suspended will tend to be driven into the liquid electrode: for as they pass into it, their places in the field are filled by the suspension medium closing in, and since this has a higher dielectric constant than the particles, the total capacity of the field is increased.

In carrying the invention into effect in one form as shown in Figure 11, a vessel $a$ is provided containing in its lower part a quantity of water, acid, alkali or salt solution, or other electrically conducting liquid $b$. Upon this liquid floats another liquid $c$, which is that used as the medium of suspension and chosen so as to have a dielectric constant intermediate between those of the particles which are to be separated from one another. In this liquid $c$, and as close as practicable to the boundary of the two liquids, is a perforated electrode $d$ connected to one of the poles of an alternating electric supply $e$ the other pole of which is led to the electrically conducting fluid in the bottom of the vessel $a$. The solid to be separated is then fed either dry or mixed with a little of the suspension medium into the top of the vessel. It then passes through the perforated electrode $d$ and that part of it having a dielectric constant greater than that of the suspension medium comes to rest upon the boundary $f$ between the two liquids, while that part of it having a dielectric constant less than that of the suspension medium is immediately forced through the boundary between the two liquids into the lower liquid $b$. It is clear that pure capillary forces act upon the solid at the boundary between the two liquids, which either oppose or assist it to pass into the lower liquid $b$, and the success of this method in any given case will therefore depend to some extent upon these forces, and can only be determined by trial. I have found that if amyl alcohol be used for the liquid $c$, and water for the liquid $b$, cassiterite may be separated from gangue, the gangue passing into the water and the cassiterite remaining behind.

The above-described apparatus is only suitable for experimental or analytical separation, since the separated material rapidly covers the interface of the two liquids. For such purposes as ore-dressing and the like I contemplate methods by which the process can be rendered continuous.

Both electrodes may be of water or other conducting liquid. For instance, the body of the liquid $b$ may be divided by vertical partitions $b^1$, as shown in Figure 11$^a$ reaching slightly into the liquid $c$ into a number of parallel strips $b^2$ connected alternately to opposite poles of the current. The electrode $d$ may then be dispensed with.

In this specification I have previously referred to the separation of non-conducting particles only. If the insulating bodies referred to be replaced by conducting bodies, they will behave as if their dielectric constant were infinite, that is to say, they will always move into the strongest part of the field. In the forms of apparatus previously described, the presence of conducting particles in the suspension gives rise to short circuits if they are permitted to accumulate on the electrodes, since they tend to form chains which finally reach from electrode to electrode and short circuit. It is, however, quite easy to avoid this effect and so apply the method to suspensions containing conducting particles, by interposing porous separators between the electrodes, or otherwise suitably insulating them.

Where point-covered plates are used as electrodes and as shown in Figures 3 and 4, the elimination of short circuits may be effected in a simple manner by the use of a vertical porous division $h$ between the said plates A and B. In this case the suspension medium may be made to flow down both sides of the partition $h$, and both plates A and B will collect conducting particles. If preferred for any reason, one of the plates may be smooth, in which case no flow of the suspension medium will be allowed to take place between it and the porous partition $h$.

Figure 12:
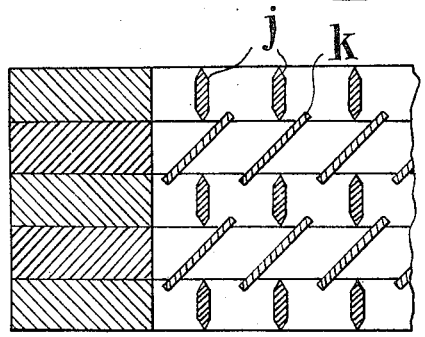
Figure 13:
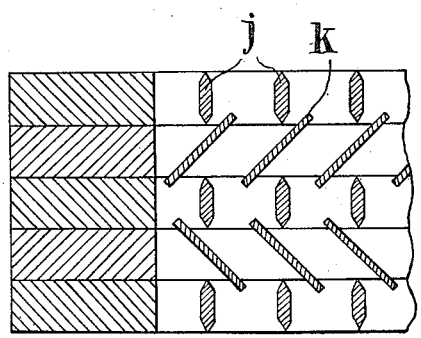

In the case of the electric sieves shown in Figures 7 and 8, various ways of disposing of the porous separators may be employed. Suitable methods are shown in Figures 12 and 13, $j$ representing the electrodes and $k$ the porous separators. The bars of alternate rows are insulated completely, if desired, by being surrounded by porous tubes, as shown at $l$ in Figure 14, their shape being such that matter from the suspension medium cannot settle out upon their upper sides. According to another plan, the bars of all gratings may be partly insulated in the manner shown in Figure 15. The insulation $o$ in this case need not be porous; it is evident, however, that complete protection is not afforded by this method.

By using aniline or nitrobenzene and paraffin oil in equal parts by volume as the suspension medium, the separation of galena, a conducting mineral, from zinc blende may be accomplished by means of apparatus with insulated gratings as above described.

Having now described my invention what I claim as new and desire to secure by Letters Patent is:—

1. A process of separating the constituents of a mixture of finely divided substances one from another, consisting in placing said substances in a suspension fluid, the dielectric constant of which lies between those of the different substances, producing an electro-static field, and placing the fluid in said field.

2. A process as claimed in claim 1 in which the suspension fluid includes a medium for preventing the formation of flakes.

3. A process as claimed in claim 1 in which the suspension fluid includes neat's foot oil for preventing the formation of flakes.

4. An apparatus for separating the constituents of a mixture of finely divided substances one from another, including a vessel containing a fluid in which said substances are suspended, the dielectric constant of said fluid lying between those of the different substances to be separated, a plurality of conducting members associated with said vessel and arranged to exert influence on said fluid and substances, and means for alternately charging said members in the opposite sense.

In testimony whereof I have signed my name to this specification.

HENRY STAFFORD HATFIELD.